Feb. 24, 1942. E. A. MORRISON 2,274,086
TESTING DEVICE FOR INTERNAL COMBUSTION MOTORS
Filed June 23, 1939
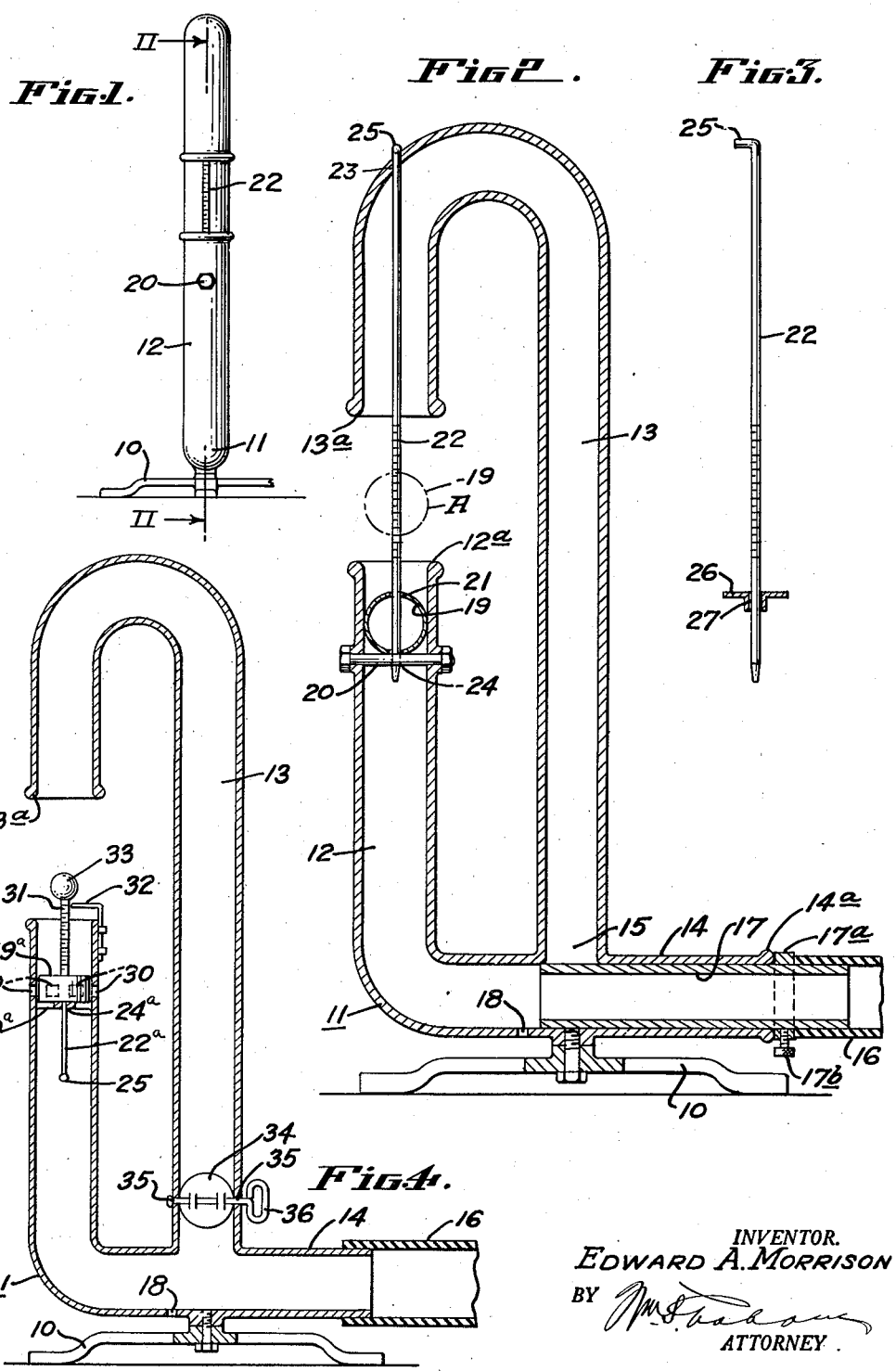
INVENTOR.
EDWARD A. MORRISON
BY
ATTORNEY.

Patented Feb. 24, 1942

2,274,086

UNITED STATES PATENT OFFICE 2,274,086

TESTING DEVICE FOR INTERNAL COMBUSTION MOTORS

Edward A. Morrison, San Francisco, Calif.

Application June 23, 1939, Serial No. 280,747

4 Claims. (Cl. 73—51)

This invention relates to testing devices for internal combustion motors. Broadly, the invention comprises a visible indicator for locating imperfect, irregular, or defective motor action which is reflected in the exhaust from the cylinders. Finding of imperfections in the action of internal combustion motors has heretofore involved a large amount of guess-work as to where the trouble in operation occurred, and frequently an entire motor is taken apart in an endeavor to locate some localized trouble which might have been remedied by some simple mechanical adjustment or operation, such as changing a spark plug or adjusting ignition points. Many devices have been devised for making tests for defective action of internal combustion motors, but for the most part have been intricate and expensive, and have been devised for and directed to ascertaining some particular type of defect.

Manifestly, if there is one or more cylinders in which no explosion occurs or if a cylinder has loose piston rings, or the spark is defective, or fuel mixture is incorrect, the defect will be reflected at the exhaust of the motor in a reduced or irregular pressure of the exhausting gases from the cylinders.

Among the objects of this invention are to provide a testing device for internal combustion motors which will visibly indicate defective action of the motor; to provide a testing device for internal combustion motors whereby varying degrees of compression in the respective cylinders may be visibly indicated; to provide a simple, efficient, visible means for carrying out the foregoing objects, and generally to improve upon devices of this character.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size and details of construction of the apparatus may be resorted to within the scope of the appended claims without departing from the spirit or sacrificing any of the advantages of the invention.

To more clearly comprehend the invention, reference is directed to the accompanying drawing, wherein:

Fig. 1 is a vertical front view of the apparatus.

Fig. 2 is an enlarged vertical section on line II—II of Fig. 1.

Fig. 3 is a vertical section of a modified type of a piston.

Fig. 4 is a vertical section of a modified form the invention may take.

Referring to the drawing, in which like characters of reference indicate corresponding parts in the several views, 10 indicates a supporting base and 11 indicates, generally, a tubular member having three hollow tubular arms 12, 13, and 14, intercommunicating at a confluence 15. Each of the arms has an open outlet end portion, respectively, 12ª, 13ª, and 14ª. The open end 14ª of tubular arm 14 is adapted for connection thereto of a conduit or hose 16 which is connected to the exhaust of the internal combustion motor to be tested. In actual practice, the hose 16 may lead to and be connected with the outlet of the muffler, when employed on an automobile, such connecting point being convenient and being for the dual purpose of removing the testing device from the heat of gases as immediately discharged from the motor, and also for reducing the pressure at the testing device by permitting the compressed gaseous charge from different types of motors (high compression and low compression) to expand in the muffler before being reflected in the testing device.

A regulating cut-off valve 17 of any suitable type is provided at the confluence 15 of the three arms so that communication between arm 13 and the other arms 12, 14, may be interrupted entirely or to any desired extent by selective manipulation of opening or closing valve 17. Shown herein in probably its simplest form, the valve 17 comprises a snugly slidable hollow tube in arm 14, and it also serves as a conduit from the hose 16 which is connected thereto at one end. The opposite end of tube 17 terminates at the confluence 15 of the arms, and it is obvious that by selective manipulation of tube 17 forwardly or rearwardly, the communication of the arm 13 with arms 12 and 14 may be regulated or entirely eliminated. A ring 17ª may be mounted circumferentially of the tube 17 and secured in position by a screw 17ᵇ. When the ring 17ª abuts the open end 14ª of the arm 14, the valve at confluence 15 is closed, and when the tube 17 is moved rearwardly, the ring 17ª visibly indicates the extent to which the valve is open. A vent 18 is provided in the tubular member 11 adjacent the confluence 15 of the three arms so that any condensation liquid in either arm will drain out of the testing apparatus. The arm 12 has its outlet end portion 12a formed upwardly substantially vertically, and the arm 13 extends substantially vertically from the confluence 15 and is then retroverted vertically downwardly at its outlet end portion 13a. This provides a juxtaposition of the open ends 12a and 13a in substantially vertically axially opposed spaced relationship. A piston member 19 is provided to initially repose in the tubular open end portion 12a of the arm 12 which serves in the nature of a cylinder for the piston 19. A rest member 20 is provided for the piston, comprising a small bar athwart the arm 12, the diameter or size of the rest member being relatively small so as not to interfere with passage of the exhausted gases through the tubular arm 12. It will be observed that the inlet end portion of the piston-mounting arm 12 has a substantially co-axial connection with the inlet arm portion 14, whereas the arm 13 of the goose-neck is lateral to the inlet portion 14. This arrangement permits the inertia of the velocity of the gases entering inlet arm 14 to carry the pressure primarily to the piston-mounting outlet to raise the piston, the amount of gases deflected into the by-pass arm 13 being regulated by valve 17. However, in some instances it has been found desirable to have the regulating valve completely open, in actual operation, in which event, the velocity of the gases through the arm 12 is sufficiently greater than through arm 13 to maintain the piston operative against gravity. The piston 19 may assume any suitable shape but having a diameter a trifle smaller than the inner diameter of the tubular arm 12, so that the piston will readily move therein, it not being necessary or desirable that there should be a snug fit between the piston and the inner wall of the arm. Though it is not intended to in any way limit the shape of the piston to the example herein shown, I have preferred to employ a substantially spherical hollow piston which for all practical purposes is a hollow ball, since this type more readily finds its seat within the open end of the arm 12. The spherical piston or ball 19 is relatively light in weight, and I have found thin aluminum sheet material saisfactory for this purpose, but have also employed balls of Celluloid and thin sheet brass. The piston or ball 19 may be provided with opposite holes 21 for the twofold purpose of permitting expansion of air therein when the ball becomes heated and also in order that a guide wire 22 may be inserted therethrough with the ball freely slidable thereon. The guide wire 22 may be supported at its upper end through a hole 23 in the upper portion of the tube 13, and be supported at its lower end through a hole 24 in the transverse rod rest member 20. The wire 22 is provided with a head 25 which maintains its position and also serves as a means whereby the wire may be withdrawn and a new ball-piston inserted thereon. For certain purposes such as testing high compression motors, or when testing any motor operating at high speed, it is desirable to employ a piston or ball of greater weight. Such change in the weight of the piston or ball is readily made by withdrawing the wire 22 and removing one ball-piston and mounting another thereon. In referring to pistons of different weights, I would state as an example of a light weight piston one weighing about an ounce. For this purpose I have employed a hollow Celluloid ball commonly known as a ping-pong ball. As an example of a piston or ball of heavier weight, a ball weighing between two and four ounces, would be efficient, but the weight of the ball or piston may be varied in accordance with the speed at which the motor is operated during testing and the type of motor, and whether it is a high or low compression engine. It is not essential that a ball type piston be employed nor that a hollow body be employed for that purpose. In Fig. 3 I have disclosed a plate 26 slidably mounted by a tubular member 27 on the guide wire 22 which passes through the plate and tubular member. The purpose of either of the members 19 or 26 is to provide a body readily acted upon and moved by the exhausting gases, regardless of whether it be called a piston, a ball, a plate or other proper designation. One reason the hollow Celluloid ball is preferred as a piston is that if the motor becomes overheated in testing, the exhausting gases will be hot enough to melt the Celluloid ball and thereby give a warning to the mechanic.

In operation, it is assumed that the internal combustion motor is operable at least to some extent. For preliminary testing purposes, it is usually not necessary to operate the motor at high speed, since high speed operation makes the successive explosions occur so close together that movement of the piston does not have time to visibly reflect a defective cylinder before a succeeding explosion in a non-defective cylinder acts upon the piston, and, therefore, defects cannot be as readily observed in the testing device by the human eye. Low speed may be stated at approximately 500 R. P. M. of the crank shaft on a four-cycle engine, not intending thereby to limit these classifications, since there are many intermediate speeds, and each mechanic employs a testing speed which best suits his individual preference. It will also be recognized that there are different types of internal combustion motors, high compression types and low compression types. In the low compression type the explosive force is not as great as in the high compression type, but this difference of explosive force is usually fairly well compensated by varying the muffler capacity, so that the force at the exhaust of the muffler is fairly uniform in both types.

Manifestly, the piston or ball 19 is moved by the force of the exhausted gases. At low speed operation of the motor the valve provided at the confluence 15 may be closed or only partially opened as it is not necessary to dissipate a large amount of the force or pressure of the exhausting gases through the by-pass of tubular arm 13.

Thus, when testing at low speed operation, the piston 19 will move upwardly from its seat at 20 to the position shown in dotted lines at A. If all the cylinders are operating properly, successive explosions will maintain the piston at that point. If, however, there are some cylinders which are operating defectively, the piston will vertically oscillate or move up and down in accordance with the varying degrees of pressure from the several cylinders. If a cylinder is not only defective, but the explosion is completely missing, the void or vacuum set up in the muffler will suck the piston instantaneously to its seat on rest member 20, but it is raised again by the exhaust of the next succeeding explosion. The by-passing of exhausted gases through the tube arm 13 provides a counterbalance against the opposite side of the piston to more evenly stabilize its action. This is only necessary with high speed testing or with high compression cylinders since, at low speed operation, the piston has a natural tendency to drop due to gravity, and the fact that the piston or ball operates beyond the open outlet end of the arm 12 provides an opportunity for the gases to expand and dissipate their force instead of being exerted in full force on the elevated piston. Therefore, in its broad aspect, the invention consists of providing a means for making the explosive force directly effective to move a means to register or visibly indicate the explosive force after that force has been minimized by dissipating a portion of the force of the exhausting gases. In operating at high speed or high compression the force is minimized in the tubular arm 12 by opening the confluence valve 17 and providing a by-pass of a portion of the explosive force through the tubular arm 13, thereby not only removing a portion of the explosive force in arm 12 but also utilizing the by-passed portion as a stabilizing force on the opposite side of the piston and preventing the piston from being forced erratically upwardly without any resistance of an opposed force.

In Fig. 4 there is illustrated a modified form of the invention, though the foregoing method of operation is substantially the same. In Fig. 4, the piston 19a vertically reciprocates in the cylinder tubular arm 12 and when at rest seats on the cross bar 20a, which as stated is of relatively small diameter so as not to appreciably obstruct the passage of exhausted gases. The bar 20a has an opening 24a for guide wire 22a which has head 25 to prevent the piston from ever going beyond the limits of the cylinder of the tubular arm. Instead of the gases expanding at the outlet end 12a of the arm 12 as in Figs. 1 and 2, the cylinder arm 12 is provided with vents 30 positioned adjacent the lower end of piston 19a when it is at rest. As soon as the piston 19a raises responsive to pressure of exhausting gases, the vents are opened so that some of the explosive force or pressure may be exhausted and diverted from the piston. The piston is provided with a calibrated gauge 31 which may carry at the top thereof a fixed member such as ball 33, the movement of which is readily visible to the mechanic, and an additional indicator 32 may be provided to facilitate a reading on the gauge. The ball 33 also provides a planar area which is affected by the pressure of gases exhausted from outlet 13a of arm 13 in like manner as explained with relation to ball 19 of Figs. 1 and 2. An alternate type of valve indicated at 34 is illustrated in Fig. 4 for regulating the by-pass of gases through arm 13. Any suitable valve may be employed, but as illustrated is a well-known cut-off type consisting of a plate or disc 34 of sufficiently less diameter than the inner diameter of arm 13 so as to perform its cut-off function, and is rotatable on pivots 35 by a finger grip 36. Since the tubular member 17 is not necessary in the modified form of Fig. 4, the hose 16 is connected directly to the intake arm 14.

By observing the movement of the piston, a mechanic may readily observe whether the cylinders are operating uniformly, since the piston should remain substantially in one position if there is uniformity of explosive force in all the cylinders. If the up and down movement of the piston is erratic, the mechanic knows that there are some cylinders less effective than others, and by testing out separate cylinders by short circuiting the spark plugs thereof and observing the effect on the piston, he can determine which particular cylinder is defectively operating. If all cylinders are equally defectively operating, that may also be determined by the fact that the piston is not raised by the explosive force in the same degree of elevation as is usual with a properly operating motor. As previously stated, if there is complete absence of explosion in one of the cylinders, the vacuum set up thereby in the muffler or exhaust line will cause the piston to be instantly though momentarily drawn to its seat until the next succeeding explosion.

I claim:

1. In a testing device for internal combustion engines, a tubular body having an inlet for communicable connection with the exhaust of the engine, and having a pair of tubular arms communicating with each other and with said inlet and having respective outlets opposingly disposed in spaced relation whereby gases exhausted from one arm outlet are directed toward the other arm outlet, and a piston supporting means mounted adjacently within one of said opposed arm outlets, the piston supporting arm having a more nearly coaxial communication with the inlet portion than the other of said arms, whereby the inertia of velocity of exhaust gases from an engine is directed with relatively greater force to the outlet of the piston supporting arm than to the outlet of the other arm.

2. A testing device for internal combustion engines, including a tubular body having an inlet for communicable connection with the exhaust of the engine, and having a pair of tubular arms communicating with each other and with said inlet and having respective outlets opposingly disposed in spaced relation whereby gases exhausted from one arm outlet are directed toward the other arm outlet, a piston supporting means mounted adjacently within one of said opposed arm outlets and adapted for supporting a reciprocally movable piston which when mounted on said support is adapted for movement responsive to the force of exhausting gases from the cylinders of the engine, and valve means for controlling the communication between the tubular arm members whereby a portion of the exhaust gases may be diverted from the piston-bearing arm to the other arm.

3. A testing device for internal combustion engines, including a tubular body having an inlet for communicable connection with the exhaust of the engine, and having a pair of tubular arms communicating with each other and with said inlet and having respective outlets opposingly disposed in spaced relation, whereby gases exhausted from one arm outlet are directed toward the other arm outlet, a piston mounted at one of said opposed arm outlets and adapted for movement responsive to the force of exhausting gases from the cylinders of the engine, guide means for said piston, and valve means for controlling the communication between the tubular arm members, said respective arm outlets being substantially axially aligned whereby the movement of the piston at one arm may be stabilized by exhausting gases from the other arm.

4. A testing device for internal combustion engines, including a tubular body having an inlet for communicable connection with the exhaust of the engine, and having a pair of tubular arms communicating with each other and with said inlet and having respective outlets opposingly disposed in spaced relation, a piston mounted at one of said opposed arm outlets and adapted for movement responsive to the force of exhausting gases from the cylinders of the engine, valve means for closing the communication between the tubular arm members, and means for visibly indicating the movement of the piston, said respective arm outlets being substantially axially aligned whereby the movement of the piston at one arm may be stabilized by exhausting gases from the other arm.

EDWARD A. MORRISON.